US008853924B2

(12) United States Patent
Quitmeyer

(10) Patent No.: US 8,853,924 B2
(45) Date of Patent: Oct. 7, 2014

(54) SPARK IGNITION DEVICE FOR AN INTERNAL COMBUSTION ENGINE, METAL SHELL THEREFOR AND METHODS OF CONSTRUCTION THEREOF

(75) Inventor: Frederick J. Quitmeyer, Rochester Hills, MI (US)

(73) Assignee: Federal-Mogul Ignition Company, Southfield, MI (US)

( * ) Notice: Subject to any disclaimer, the term of this patent is extended or adjusted under 35 U.S.C. 154(b) by 614 days.

(21) Appl. No.: 12/750,775

(22) Filed: Mar. 31, 2010

(65) Prior Publication Data

US 2011/0241522 A1 Oct. 6, 2011

(51) Int. Cl.

| | |
|---|---|
| ***H01T 13/00*** | (2006.01) |
| ***H01T 13/20*** | (2006.01) |
| ***B23K 26/00*** | (2014.01) |
| ***H01T 21/02*** | (2006.01) |
| ***H01T 13/32*** | (2006.01) |

(52) U.S. Cl.

CPC ................ *H01T 13/32* (2013.01); *H01T 21/02* (2013.01)

USPC ........... 313/118; 313/141; 313/142; 313/143; 219/121.64; 445/7

(58) Field of Classification Search

USPC ......................... 313/118, 138, 139, 141–144; 219/121.64; 445/7

See application file for complete search history.

(56) References Cited

U.S. PATENT DOCUMENTS

| | | | |
|---|---|---|---|
| 6,307,307 | B1 | 10/2001 | Kanao |
| 6,326,719 | B1 | 12/2001 | Boehler et al. |
| 6,373,172 | B1 | 4/2002 | Kanao et al. |
| 6,406,345 | B2 | 6/2002 | Boehler et al. |
| 7,305,954 | B2 | 12/2007 | Hagiwara et al. |
| 7,328,677 | B2 | 2/2008 | Hagiwara et al. |
| 7,557,495 | B2 | 7/2009 | Tinwell |
| 7,586,246 | B2 | 9/2009 | Okamoto |
| 2002/0063504 | A1 | 5/2002 | Hori |

(Continued)

FOREIGN PATENT DOCUMENTS

| | | | |
|---|---|---|---|
| JP | 2005346928 | A | 12/2005 |
| WO | 0077901 | A1 | 12/2000 |
| WO | WO2008089048 | A1 | 7/2008 |

OTHER PUBLICATIONS

International Search Report, Mailed on Apr. 5, 2013 (PCT/US2013/024311).

*Primary Examiner* — Anh Mai
*Assistant Examiner* — Brenitra M Lee
(74) *Attorney, Agent, or Firm* — Robert L. Stearns; Dickinson Wright, PLLC

(57) ABSTRACT

A spark ignition device, metal shell, and methods of construction are provided. The spark ignition device has a ceramic insulator extending along a longitudinal axis and a metal shell. The metal shell extends along the longitudinal axis to a distal end. A center electrode is received in the ceramic insulator and extends along the longitudinal axis. A ground electrode has an attachment end fixed by a weld joint to the distal end of the shell and a free end extending from the distal end to provide a spark gap. The weld joint includes a resistance weld joint and a laser weld joint, which in combination inhibit material expulsion; provide a reliable, strong attachment of the ground electrode to the shell; provide an improved heat transfer path between the ground electrode and the shell, and facilitate repeatable and accurate positioning of the ground electrode to the shell.

34 Claims, 4 Drawing Sheets

(56) References Cited

U.S. PATENT DOCUMENTS

| | | | | |
|---|---|---|---|---|
| 2005/0174025 | A1 | 8/2005 | Okamoto | |
| 2006/0082276 | A1 | 4/2006 | Havard et al. | |
| 2007/0114901 | A1 | 5/2007 | Nagasawa et al. | |
| 2008/0100193 | A1 | 5/2008 | Takeuchi et al. | |
| 2008/0174221 | A1 | 7/2008 | Tinwell | |
| 2008/0174222 | A1* | 7/2008 | Kowalski et al. | 313/141 |
| 2008/0238283 | A1 | 10/2008 | Nakamura et al. | |
| 2009/0194053 | A1 | 8/2009 | Nakamura et al. | |
| 2009/0227168 | A1 | 9/2009 | Nakamura et al. | |
| 2009/0227169 | A1 | 9/2009 | Nakamura et al. | |
| 2010/0102728 | A1 | 4/2010 | Kato et al. | |
| 2011/0241522 | A1 | 10/2011 | Quitmeyer | |

* cited by examiner

FIG. 2A
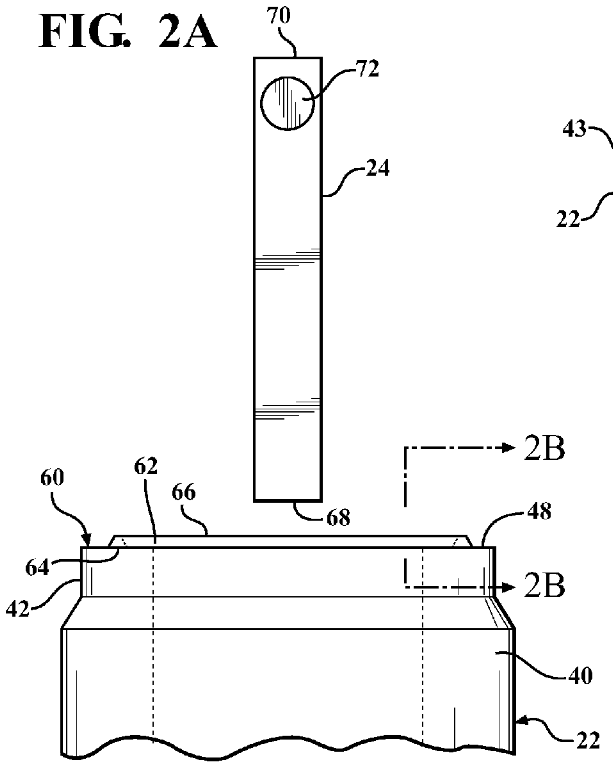
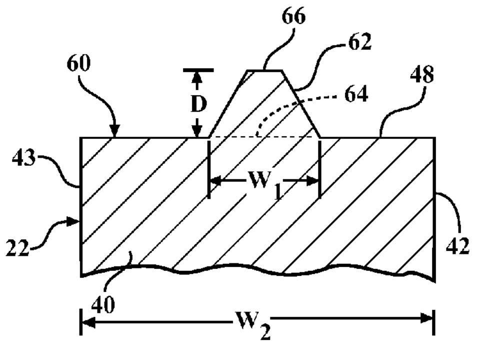
FIG. 2B
FIG. 2C
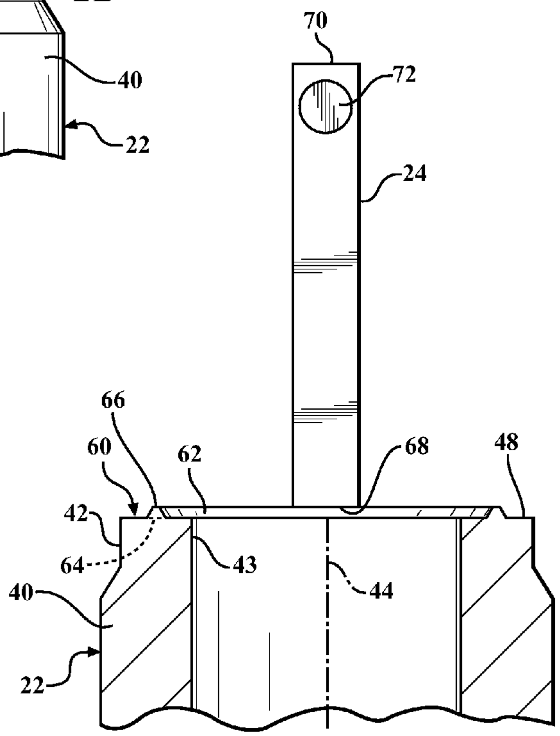

SPARK IGNITION DEVICE FOR AN INTERNAL COMBUSTION ENGINE, METAL SHELL THEREFOR AND METHODS OF CONSTRUCTION THEREOF

BACKGROUND OF THE INVENTION

1. Technical Field

This invention relates generally to spark ignition devices, such as spark plugs for internal combustion engines, and more particularly to ground electrodes attached to a metal shell of the spark ignition device and to their method of attachment to the metal shell.

2. Related Art

Modern automotive vehicles are required to meet increased power, low fuel consumption, and low exhaust emissions requirements, thus resulting in an increase in temperature of burning atmosphere in the engine. Therefore, weld joints between a metal shell of a spark ignition device and a ground electrode are subjected to increased temperatures, and thus, have become more prone to cracking, thus resulting in separation of the ground electrode from the metal shell.

When the ground electrode is joined to the metal shell using typical laser welding techniques, a weld joint formed between them is usually small, which could result in a lack of the strength of the joint. In addition, the laser weld joint process typically results in the material of the ground electrode and the metal shell expelling radially inwardly into a cavity of the shell and/or radially outwardly from the shell. As such, secondary, inefficient and costly manufacturing operations are needed to "clean-up" the expelled material. Further yet, if the laser weld joint is formed with a gap or voids existing and remaining between the ground electrode and the shell, the laser weld joint can be subject to premature failure.

In accordance with other known processes, the ground electrode can be resistance welded to the shell. However, a weld joint formed solely by a resistance weld process generally requires the ground electrode to be upset, i.e. pushed into the material of the shell while high current flows, thereby causing material of the ground electrode and the metal shell to be expelled as discussed above, thus requiring secondary, inefficient and costly manufacturing operations to "clean-up" the expelled material. Further, a resistance weld joint is formed primarily as a "forge weld", which produces limited fused material in the weld joint, thus lending to a weld joint that has relatively low strength.

In addition to the problems associated with the known processes discussed above, accurately positioning the ground electrode relative to the metal shell and providing an improved heat transfer path between the ground electrode and the shell remain an area where advances are sought for improvement.

A spark ignition device constructed in accordance with this invention addresses these and other issues, as will be apparent to one having ordinary skill in the art.

SUMMARY OF THE INVENTION

According to one aspect of the invention, a spark ignition device is provided. The spark ignition device has a generally annular ceramic insulator extending along a longitudinal axis and a metal shell surrounding at least a portion of the ceramic insulator. The metal shell extends along the longitudinal axis between a proximal end and a distal end. A center electrode is received at least in part in the ceramic insulator and extends coaxially along the longitudinal central axis. A ground electrode has an attachment end fixed by a weld joint to the distal end of the shell and a free end extending from the distal end to provide a spark gap between the center electrode and the ground electrode. The weld joint includes a resistance weld joint and a laser weld joint, which in combination inhibit material expulsion; provide a reliable, strong attachment of the ground electrode to the shell; provide an improved heat transfer path between the ground electrode and the shell, and facilitate repeatable and accurate positioning of the ground electrode to the shell.

In accordance with another aspect of the invention, a metal shell for a spark ignition device is provided. The metal shell includes an annular body extending along a longitudinal axis between a proximal end and a distal end and a ground electrode having an attachment end fixed by a weld joint to the distal end of the body and a free end extending from the distal end. The weld joint includes a weld pool having a resistance weld joint and a laser weld joint.

In accordance with another aspect of the invention, a method of constructing a spark ignition device is provided. The method includes providing a generally annular ceramic insulator extending along a longitudinal axis and disposing a center electrode at least in part in the ceramic insulator. Further, disposing a metal shell around at least a portion of the ceramic insulator with the metal shell extending along the longitudinal axis to a distal end. In addition, resistance welding an attachment end of a ground electrode to the distal end of the shell, and then, laser welding the attachment end of the ground electrode to the distal end of the shell.

In accordance with another aspect of the invention, a method of constructing an outer metal shell for a spark ignition device is provided. The method includes forming an annular metal shell extending along the longitudinal axis between a proximal end and a distal end. Further, providing a ground electrode having an attachment end and a firing end. Then, resistance welding the attachment end of the ground electrode to the distal end of the shell, and further yet, laser welding the attachment end of the ground electrode to the distal end of the shell.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 2A is an enlarged partial elevation view of the ignition device showing the ground electrode detached from the distal end of the metal shell;

FIG. 2B is an enlarged cross-sectional taken generally along the line 2B-2B of FIG. 2A;

FIG. 2C is a view showing the attachment end of the ground electrode resting on the distal end of the metal shell;

DETAILED DESCRIPTION OF PRESENTLY PREFERRED EMBODIMENTS

Figure 1:
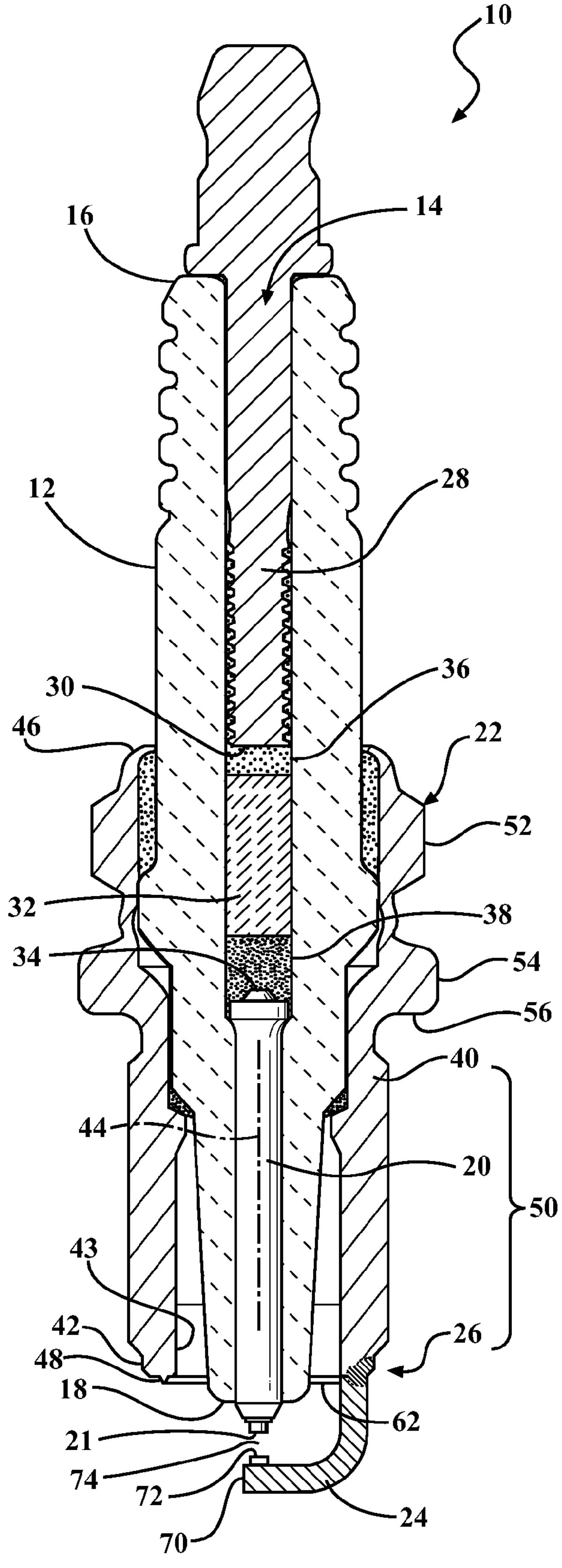
FIG. 1 is a cross-sectional elevation view of an ignition device with a ground electrode attached to a distal end of an outer metal shell in accordance with one aspect of the invention.

Referring in more detail to the drawings, FIG. 1 illustrates a spark ignition device 10 constructed in accordance with one presently preferred aspect of the invention for use in igniting a fuel/air mixture in internal combustion engines. The exemplary spark ignition device 10 is illustrated in the form of a spark plug that includes, among other things, an annular ceramic insulator 12 fabricated of aluminum oxide or another suitable electrically insulating material in known manner. The insulator 12 has a central passage 14 extending longitudinally between an upper terminal end 16 and a lower nose or core end 18 in which a center electrode 20 is disposed. The center electrode 20 has a sparking surface, referred to hereafter as sparking tip 21, at a free end thereof. An electrically conductive metal shell 22 is disposed in sealed relation about the lower and mid portions of the insulator 12 and may be made from any suitable metal, such as various steel alloys, and may be coated with a Zn or Ni-base alloy coating or the like in known manner. The shell 22 has at least one ground electrode 24 fixed thereto via a weld joint 26 manufactured in accordance with the invention, such that the ground electrode 24 is accurately positioned with minimal upset and deformation to the shell 22, thus resulting in minimal or no secondary clean-up of expelled material; a reliable, strong attachment is made via the weld joint 26; an improved heat transfer path is established between the ground electrode 24 and the shell 22; and repeatable location and orientation of attachment of the ground electrode 24 to the shell 22 is assured.

An electrically conductive terminal stud 28 is disposed in the central passage 14 of the insulator 12 with a free lower end 30 of the terminal stud 28 being disposed adjacent a resistor layer 32 which is arranged between the lower end 30 and an upper end 34 of the center electrode 20. Conductive glass seals 36, 38 separate the resistor layer 32 from the stud 28 and center electrode 20, respectively. This resistor layer 32 can be made from any suitable composition used in such applications to suppress electromagnetic interference (EMI).

The electrically conductive metal shell 22 may be made from any suitable metal, including various coated and uncoated steel alloys. The shell 22 has a generally annular, tubular shell body 40 with a generally annular outer surface 42 and inner surface 43 extending along a longitudinal central axis 44 between an upper terminal end 46, also referred to as proximal end and a lower fastening end 48, also referred to as distal end. The fastening end 48 typically has an external threaded region 50 configured for threaded attachment within a combustion chamber opening of an engine block (not shown). The shell 12 may be provided with an external hexagonal tool receiving member 52 or other feature to facilitate removal and installation of the spark plug 10 in the combustion chamber opening. The feature size will preferably conform with an industry standard tool size of this type for the related application. Of course, some applications may call for a tool receiving interface other than a hexagon, such as slots to receive a spanner wrench, or other features such as are known in racing spark plug and other applications. The shell 12 also has an annular flange 54 extending radially outwardly from the outer surface 42 to provide an annular, generally planar sealing seat 56 from which the threaded region 50 depends. The sealing seat 56 may be paired with a gasket (not shown) to facilitate a hot gas seal of the space between the outer surface of the shell 22 and the threaded bore in the combustion chamber opening. Alternately, the sealing seat 56 may be configured as a tapered seat located along the lower portion of the shell 22 to provide a close tolerance and a self-sealing installation in a cylinder head which is also designed with a mating taper for this style of spark plug seat.

To facilitate fixing the ground electrode 24 to the shell 22, the distal end 48 of the shell 22 has a substantially planar surface 60 extending transversely to the central axis 44 with a projection or protrusion 62 extending axially outwardly therefrom. The projection 62 can be formed using a variety of processes, including, by way of example and without limitation, machining, cold forming or molding. The projection 62 is represented as an annular rib extending about the entire circumference of the distal end 48, wherein the rib is represented as being generally trapezoidal in axial cross-section, having a base 64 and a plateau peak 66, by way of example. It should be recognized the other geometries as view in axial cross-section are contemplated herein, such as triangular, rectangular, or semicircular, for example. As best shown in FIG. 2B, the projection 62 is generally centered between the radially outer surface 42 and radially inner surface 43, wherein the base 64 of the projection 62 is represented as having a width W1 that is smaller than a width W2 extending between the outer and inner surfaces 42, 43 immediately adjacent the planar surface 60 to prevent or substantially prevent expulsion of flash of the material of the projection 62 upon fixing the ground electrode 24 to the shell 22. The projection 62 extends axially from the base 64 to the peak 66 over a predetermined distance D, such as between about 0.005" to 0.015", for example, wherein D is predetermined to further prevent or substantially prevent expulsion of the material of the projection 62 upon fixing the ground electrode 24 to the shell 22.

The ground electrode 24 has an attachment end 68 fixed by the weld joint 26 to the distal end 48 of the shell 22 and a free end 70 extending from the attachment end 68 with a sparking tip 72 attached thereto to provide a spark gap 74 between the sparking tip 21 of the center electrode 20 and the sparking tip 72 of the ground electrode 24. The ground electrode 24 may have any of a number of shapes, sizes and configurations, such as the standard single L-shaped configuration illustrated in the drawings, by way of example and without limitation. As best shown in FIG. 3B, the attachment end has a predetermined width W3 that is greater than the width W1 of the base 64 of the projection 62, wherein the width W3 is also substantially equal to or slightly reduced from the width W2 of the shell wall immediately adjacent the planar surface 60. As such, as discussed further below, upon fixing the ground electrode 24 to the shell 22, the material of the projection 62 is prevented or substantially inhibited from being expelled outwardly from beneath the attachment end 68 of the ground electrode 24.

Figure 2D:
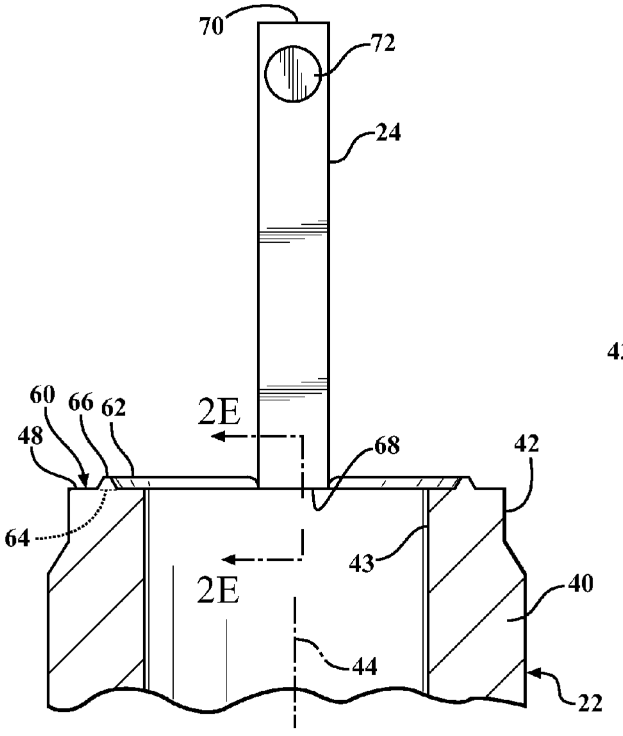
FIG. 2D is a view similar to FIG. 2C showing the attachment end of the ground electrode resistance welded to the distal end of the metal shell.
Figure 2E:
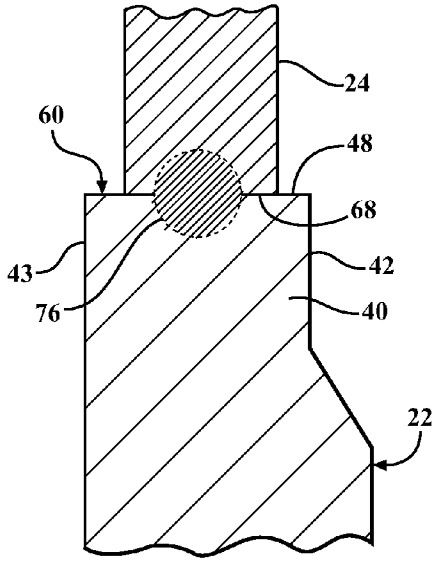
FIG. 2E is an enlarged cross-sectional view taken generally along the line 2E-2E of FIG. 2D.

During the attachment process of fixing the ground electrode 24 to the distal end 48 of the shell 22, as shown in FIG. 2C, the attachment end 68 of the ground electrode 24 is brought into abutment with the peak 66 of the projection 62, such that the peak 66 is substantially centered between the width W3 of the attachment end 68. Then, a resistance welding process ensues whereupon the attachment end 68 sinks into the projection 62 until the attachment end 68 becomes flush or substantially flush with the planar surface 60 of the shell distal end 48, as best shown in FIG. 2D. Upon performing the resistance welding process, a resistance weld joint 76 is formed between the attachment end 68 of the ground electrode 24 and the distal end 48 of the shell 22, wherein, owing to the geometric relations between the respective widths W1, W2 and W3, the resistance weld joint 76 provides a gap free interface between the attachment end 68 and the planar surface 60, while at the same time, the resistance weld joint 76 remains confined or substantially confined beneath the width W3 of the ground electrode attachment end 68, thereby preventing or inhibiting expulsion of the material of the shell distal end 48 outwardly from the attachment end 68 of the ground electrode 24.

Figure 3A:
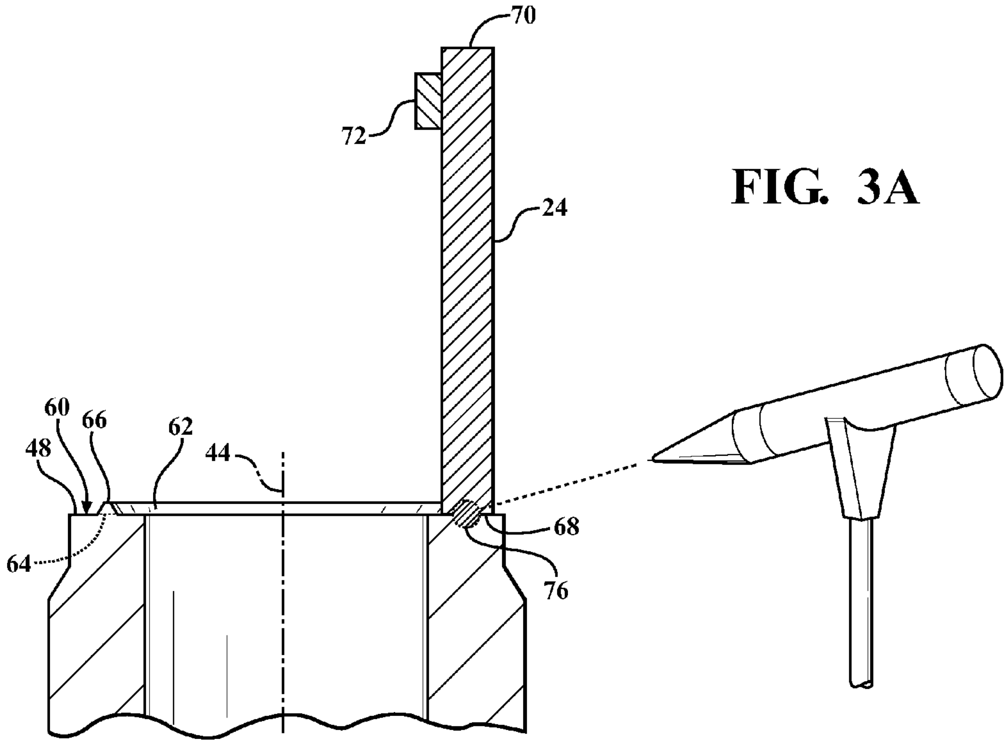
FIG. 3A is a cross-sectional view showing the initiating of a laser weld joint of the attachment end to the distal end of the ground electrode.
Figure 3B:
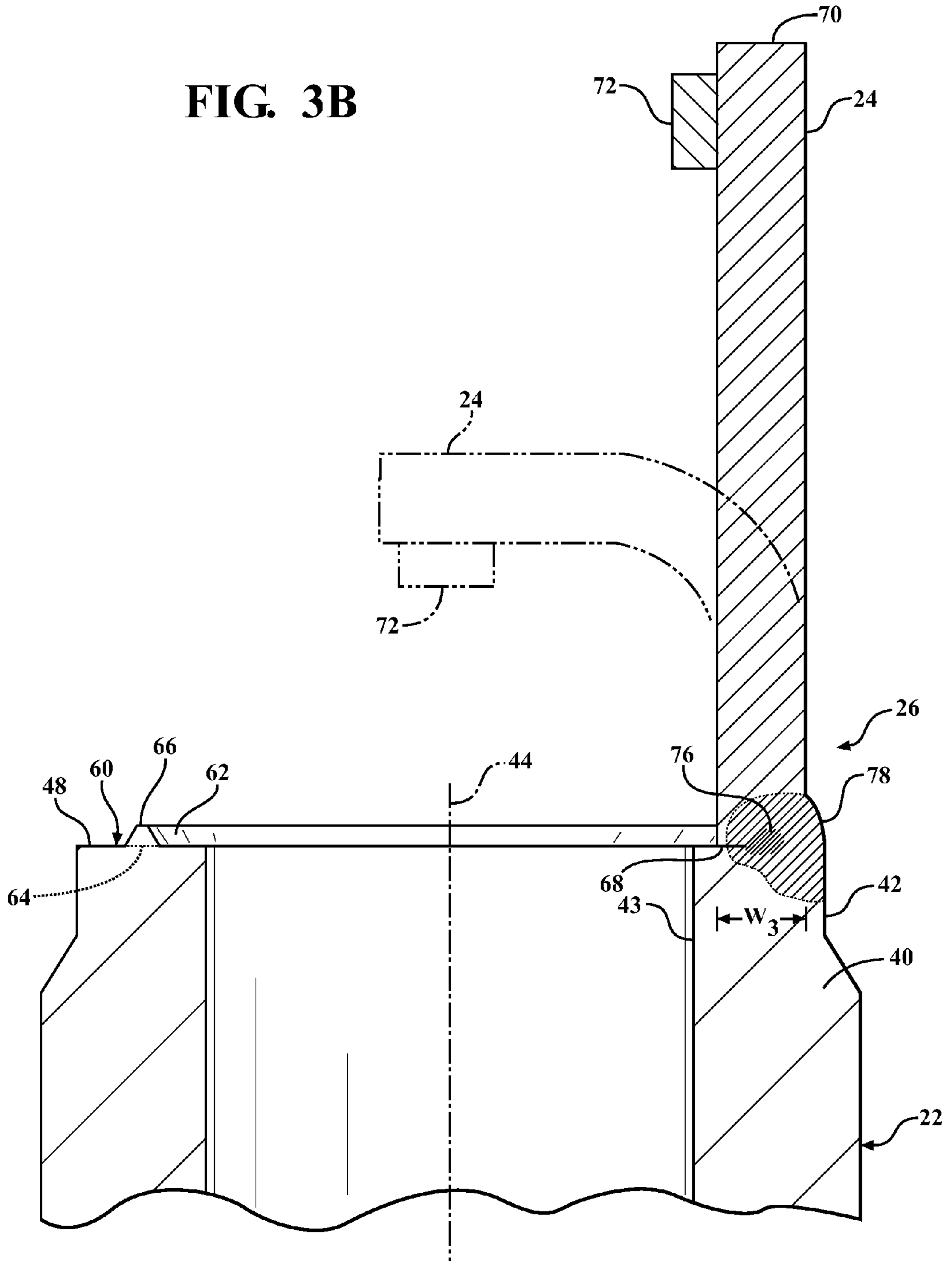
FIG. 3B is a view similar to FIG. 3A showing the completion of the laser weld joint fixing the ground electrode to the distal end of the ground electrode.

Then, as shown in FIGS. 3A and 3B, upon forming the resistance weld joint 76 to locate the ground electrode 24 in its preferred position relative to the shell 22, further securing of the ground electrode 24 to the shell 22 ensues via a laser welding process, wherein a laser weld joint 78 is formed substantially about the attachment end 68 of the ground electrode 24. The laser weld joint 78 is formed without altering or substantially altering the location of the ground electrode 24 relative to the shell 22, and thus, the attachment end 68 of the ground electrode 24 remains flush or substantially flush with the planar surface 60 of the shell 22. As such, the laser weld joint 78 that is formed comprising a blend of the materials of the shell 22, including material from the projection 62 and the ground electrode 24 does not cause material to be expelled significantly to the degree requiring secondary operation clean-up. As such, the laser weld process is economical in manufacture, and further, provides, in combination with the resistance weld joint 76, added assurance that the ground electrode 24 and its sparking tip 72 remain properly positioned in use, while further contributing to the ability to form a reliable, strong attachment of the ground electrode 24 to the shell 22; to provide an improved heat transfer between the ground electrode 24 and the shell 22; and to provide a repeatable location and orientation of attachment of the ground electrode 24 to the shell 22 throughout the manufacturing process.

Obviously, many modifications and variations of the present invention are possible in light of the above teachings. It is, therefore, to be understood that within the scope of the appended claims, the invention may be practiced otherwise than as specifically described. Accordingly, the invention is ultimately defined by the scope of any allowed claims, and not solely by the exemplary embodiments discussed above.

What is claimed is:

1. A spark ignition device, comprising:

a generally annular ceramic insulator extending along a longitudinal axis of said spark ignition device;

a metal shell surrounding at least a portion of said ceramic insulator, said metal shell extending along said longitudinal axis between a proximal end and a distal end, said distal end presenting a planar surface;

a center electrode received at least in part in said ceramic insulator and extending coaxially along said longitudinal central axis; and a ground electrode having an attachment end fixed by a weld joint to said distal end of said shell and a free end extending from said distal end to provide a spark gap between said center electrode and said ground electrode, said weld joint including a resistance weld joint and a laser weld joint, and said attachment end of said ground electrode being flush with said planar surface of said distal end of said metal shell.

2. The spark ignition device of claim 1 wherein said planar surface extends transversely to said longitudinal axis.

3. The spark ignition device of claim 2 wherein said distal end of said metal shell has a protrusion extending axially from said planar surface, and said attachment end of said ground electrode extends into said protrusion.

4. The spark ignition device of claim 3 wherein said weld joint includes material of said protrusion.

5. The spark ignition device of claim 3 wherein said protrusion is annular.

6. A metal shell for a spark ignition device, comprising:

an annular shell body extending along a longitudinal axis between a proximal end and a distal end, said distal end presenting a planar surface; and a ground electrode having an attachment end fixed by a weld joint to said distal end of said shell and a free end extending from said distal end, said weld joint including a resistance weld joint and a laser weld joint, and said attachment end of said ground electrode being flush with said planar surface of said distal end of said metal shell.

7. The metal shell of claim 6 wherein said planar surface extends transversely to said longitudinal axis.

8. The metal shell of claim 7 wherein said distal end of said metal shell has a protrusion extending axially from said planar surface, and said attachment end of said ground electrode extends into said protrusion.

9. The metal shell of claim 8 wherein said weld joint includes material of said protrusion.

10. The metal shell of claim 8 wherein said protrusion is annular.

11. A method of constructing a spark ignition device, comprising:

providing a generally annular ceramic insulator extending along a longitudinal axis;

disposing a center electrode at least in part in the ceramic insulator;

disposing a metal shell around at least a portion of the ceramic insulator with the metal shell extending along the longitudinal axis to a distal end, the distal end of the metal shell presenting a planar surface and a protrusion extending axially outwardly from the planar surface;

resistance welding an attachment end of a ground electrode to the distal end of the shell, the resistance welding step including sinking the attachment end of the ground electrode into the protrusion until the attachment end is flush with the planar surface of the distal end of the metal shell; and laser welding the attachment end of the ground electrode to the distal end of the shell.

12. The method of claim 11 wherein the planar surface extends transversely to the longitudinal axis.

13. The method of claim 11 further including forming a weld joint via the laser welding to include material of the protrusion.

14. The method of claim 11 wherein the protrusion has an annular configuration about the distal end.

15. A method of constructing an outer metal shell for a spark ignition device, comprising:

forming an annular metal shell extending along the longitudinal axis between a proximal end and a distal end, the distal end of the metal shell presenting a planar surface and a protrusion extending axially outwardly from the planar surface;

providing a ground electrode having an attachment end and a firing end;

resistance welding the attachment end of the ground electrode to the distal end of the shell, the resistance welding step including sinking the attachment end of the ground electrode into the protrusion until the attachment end is flush with the planar surface of the distal end of the metal shell; and laser welding the attachment end of the ground electrode to the distal end of the shell.

16. The method of claim 15 wherein the planar surface extends transversely to the longitudinal axis.

17. The method of claim 15 wherein the protrusion has an annular configuration about the distal end.

18. The method of claim 15 further including forming a weld joint via the laser welding to include material of the protrusion.

19. The spark ignition device of claim 3 wherein said weld joint extends axially through said protrusion to said planar surface of said metal shell.

20. The metal shell of claim 8 wherein said weld joint extends axially through said protrusion to said planar surface of said metal shell.

21. A spark ignition device, comprising:

an annular insulator extending along a longitudinal axis;

a metal shell surrounding at least a portion of said insulator, said metal shell extending along said longitudinal axis between a proximal end and a distal end, said distal end presenting a planar surface;

a center electrode received at least in part in said insulator and extending coaxially along said longitudinal axis; and a ground electrode having an attachment end fixed by a weld joint to said distal end of said shell, said weld joint including a first weld joint and a laser weld joint, and said weld joints being different from one another, and said attachment end of said ground electrode being flush with said planar surface of said distal end of said metal shell.

22. The spark ignition device of claim 21 wherein said metal shell and said ground electrode are each formed of a metal material, and said weld joint includes a blend of said materials.

23. A metal shell for a spark ignition device, comprising:

a shell body extending along a longitudinal axis between a proximal end and a distal end, said distal end presenting a planar surface; and a ground electrode having an attachment end fixed by a weld joint to said distal end of said shell, said weld joint including a first weld joint and a laser weld joint, and said weld joints being different from one another, and said attachment end of said ground electrode being flush with said planar surface of said distal end of said metal shell.

24. The metal shell of claim 23 wherein said shell body and said ground electrode are each formed of a metal material, and said weld joint includes a blend of said materials.

25. The method of claim 11 wherein the laser welding step is after the resistance welding step.

26. The method of claim 15 wherein the laser welding step is after the resistance welding step.

27. A method of constructing a spark ignition device, comprising:

providing an insulator extending along a longitudinal axis;

disposing a center electrode at least in part in the ceramic insulator;

disposing a metal shell around at least a portion of the ceramic insulator with the metal shell extending along the longitudinal axis to a distal end, the distal end of the metal shell presenting a planar surface and a protrusion extending axially outwardly from the planar surface;

welding an attachment end of a ground electrode to the distal end of the shell, the welding step including sinking the attachment end of the ground electrode into the protrusion until the attachment end is flush with the planar surface of the distal end of the metal shell;

laser welding the attachment end of the ground electrode to the distal end of the shell; and the first welding step and the laser welding step being different from one another.

28. The method of claim 27 wherein the laser welding step is after the first welding step.

29. A method of constructing an outer metal shell for a spark ignition device, comprising:

forming a metal shell extending along a longitudinal axis between a proximal end and a distal end, the distal end of the metal shell presenting a planar surface and a protrusion extending axially outwardly from the planar surface;

providing a ground electrode having an attachment end and a firing end;

welding the attachment end of the ground electrode to the distal end of the shell, the welding step including sinking the attachment end of the ground electrode into the protrusion until the attachment end is flush with the planar surface of the distal end of the metal shell;

laser welding the attachment end of the ground electrode to the distal end of the shell; and the first welding step and the laser welding step being different from one another.

30. The method of claim 29 wherein the laser welding step is after the first welding step.

31. The spark ignition device of claim 3 wherein said planar surface of said metal shell has a width, said attachment end of said ground electrode has a width, said protrusion has a width, said width of said planar surface of said metal shell is greater than said width of said attachment end of said ground electrode, and said width of said attachment end is greater than said width of said protrusion.

32. The spark ignition device of claim 31 wherein said protrusion extends from a base at said planar surface of said metal shell to a peak, said width of said protrusion decreases from said base to said peak, and said peak is centered between said width of said attachment end of said ground electrode.

33. The method of claim 11 wherein the attachment end of the ground electrode presents a width, and the resistance welding step includes centering the protrusion between the width of the attachment end of the ground electrode.

34. The method of claim 33 wherein the planar surface of the distal end of the metal shell has a width, the attachment end of the ground electrode has a width, the width of the distal end of the metal shell is greater than the width of the attachment end of the ground electrode, and the width of the attachment end of the ground electrode is greater than the width of the protrusion; and before the welding steps the protrusion extends from a base at the planar surface of the metal shell to a peak, the width of the protrusion decreases from the base to the peak; and during the resistance welding step the peak is centered between the width of the attachment end of the ground electrode.

* * * * *